United States Patent
Watanabe

(10) Patent No.: US 11,210,778 B2
(45) Date of Patent: Dec. 28, 2021

(54) IMAGE PROCESSING METHOD AND IMAGE PROCESSING APPARATUS THAT GENERATE AN INSPECTION REGION SERVING AS A TARGET OF IMAGE PROCESSING

(71) Applicant: CANON KABUSHIKI KAISHA, Tokyo (JP)

(72) Inventor: Kei Watanabe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 226 days.

(21) Appl. No.: 16/657,099

(22) Filed: Oct. 18, 2019

(65) Prior Publication Data
US 2020/0126204 A1 Apr. 23, 2020

(30) Foreign Application Priority Data
Oct. 22, 2018 (JP) .............................. JP2018-198743

(51) Int. Cl.
G06T 7/00 (2017.01)
G06K 9/32 (2006.01)

(52) U.S. Cl.
CPC ............ G06T 7/001 (2013.01); G06K 9/3233 (2013.01); *G06T 2207/30164* (2013.01)

(58) Field of Classification Search
CPC . G06T 7/001; G06T 2207/30164; G06T 7/13; G06T 7/136; G06T 2207/10116; G06T 2207/10048; G06T 2207/10028; G06K 9/3233; G06K 9/4604; G06K 9/4647
See application file for complete search history.

(56) References Cited

U.S. PATENT DOCUMENTS

| | | | |
|---|---|---|---|
| 5,943,437 A * | 8/1999 | Sumie | H01L 22/20 382/149 |
| 6,529,622 B1 * | 3/2003 | Pourjavid | H04N 5/367 250/370.09 |
| 9,892,504 B2 | 2/2018 | Kotake et al. | |
| 10,311,559 B2 | 6/2019 | Takimoto et al. | |

(Continued)

FOREIGN PATENT DOCUMENTS

| | | |
|---|---|---|
| JP | 2006-194607 A | 7/2006 |
| JP | 2013-191064 A | 9/2013 |
| JP | 2016-114592 A | 6/2016 |

*Primary Examiner* — Aaron W Carter
(74) *Attorney, Agent, or Firm* — Venable LLP

(57) ABSTRACT

An image processing apparatus includes an identifiability value obtaining portion, an inspection region generation portion, and an image inspection portion. The identifiability value obtaining portion is configured to obtain, for each pixel address constituting an image plane, an identifiability value for identifying which of a first inspection result and a second inspection result the pixel address corresponds to. The inspection region generation portion is configured to generate an inspection region serving as a target of image processing by setting a portion of the image plane including the pixel address where the obtained identifiability value satisfies a specific condition as the inspection region. The image inspection portion is configured to perform image processing for inspection on a partial image corresponding to the inspection region among a third image obtained by imaging a third target object.

16 Claims, 9 Drawing Sheets

(56) References Cited

U.S. PATENT DOCUMENTS

| | | | |
|---|---|---|---|
| 2010/0067780 A1* | 3/2010 | Kawaragi | B81C 99/005 382/149 |
| 2010/0074516 A1* | 3/2010 | Kawaragi | G06T 7/001 382/149 |
| 2011/0188779 A1* | 8/2011 | Sakanaga | G06K 9/36 382/286 |
| 2013/0242294 A1* | 9/2013 | Taniguchi | G01N 21/95623 356/237.5 |
| 2014/0210995 A1* | 7/2014 | Abe | H01L 33/005 348/93 |
| 2014/0234994 A1* | 8/2014 | Abe | G01N 21/6489 438/16 |
| 2014/0314302 A1* | 10/2014 | Minato | G06T 7/194 382/141 |
| 2015/0022580 A1* | 1/2015 | Goto | H04N 1/6036 347/19 |
| 2015/0055823 A1* | 2/2015 | Kotake | G01N 21/956 382/103 |
| 2017/0148153 A1* | 5/2017 | Nakao | G06T 7/0004 |
| 2017/0148154 A1* | 5/2017 | Nakao | G06T 7/74 |
| 2017/0154234 A1* | 6/2017 | Tanaka | G06K 9/6284 |
| 2017/0249766 A1* | 8/2017 | Namiki | G06K 9/66 |
| 2017/0352142 A1* | 12/2017 | Tsuchiya | G06T 7/001 |
| 2019/0095742 A1* | 3/2019 | Fujimori | G06T 7/50 |
| 2019/0331608 A1* | 10/2019 | Terasawa | G01N 21/95623 |
| 2020/0025692 A1* | 1/2020 | Hisano | H01L 21/67288 |
| 2020/0126204 A1* | 4/2020 | Watanabe | G06K 9/3233 |
| 2021/0097675 A1* | 4/2021 | Koga | G06N 20/00 |
| 2021/0183052 A1* | 6/2021 | Ikeda | G06N 3/08 |

\* cited by examiner

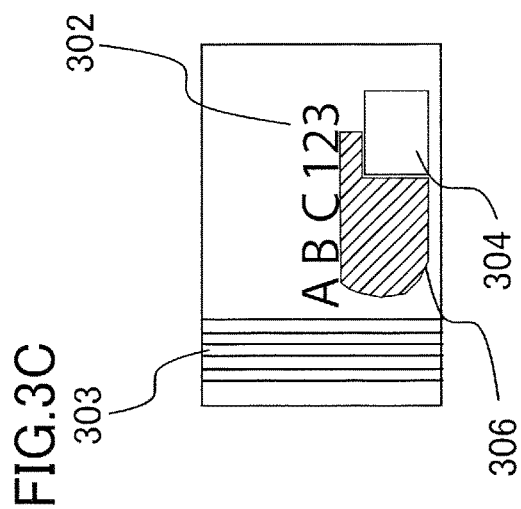
FIG.3A
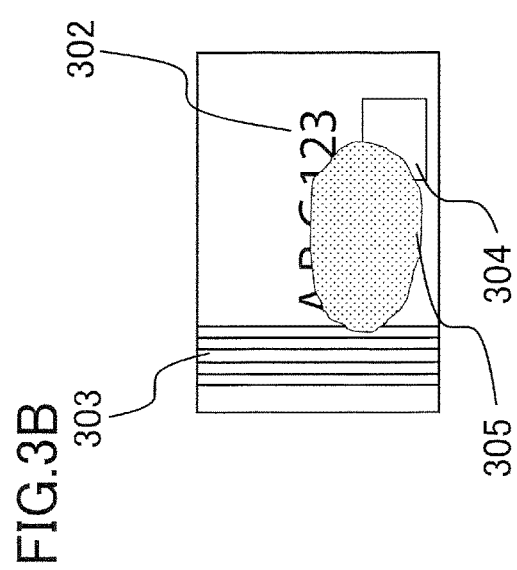
FIG.3B
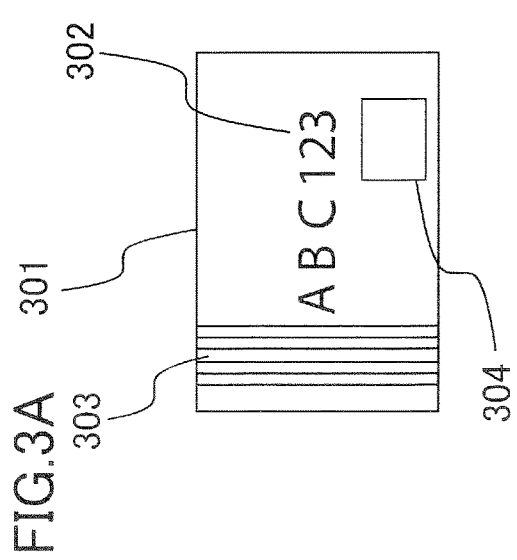
FIG.3C
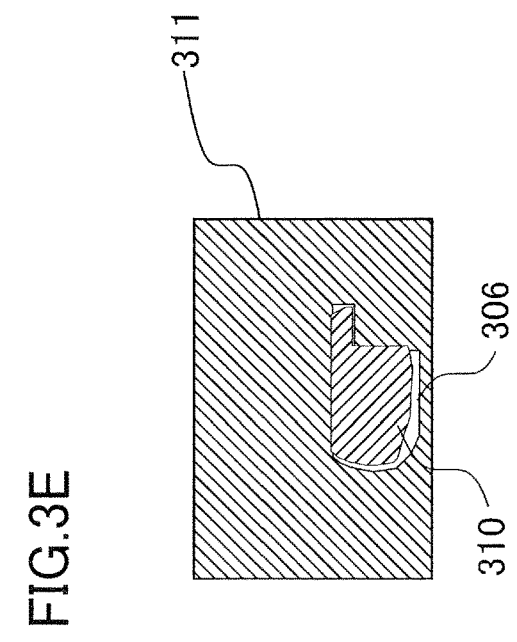
FIG.3D
FIG.3E
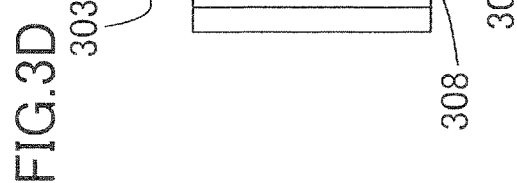

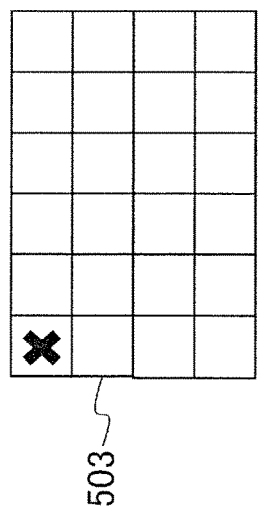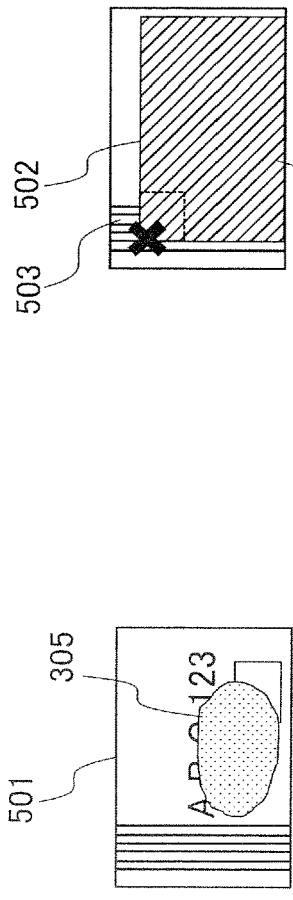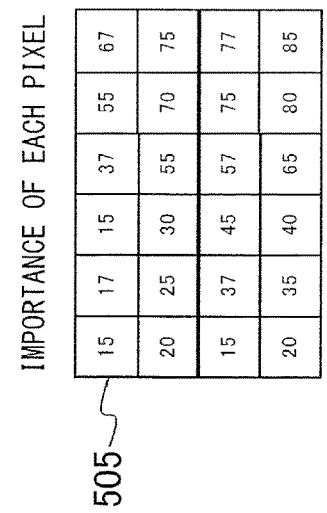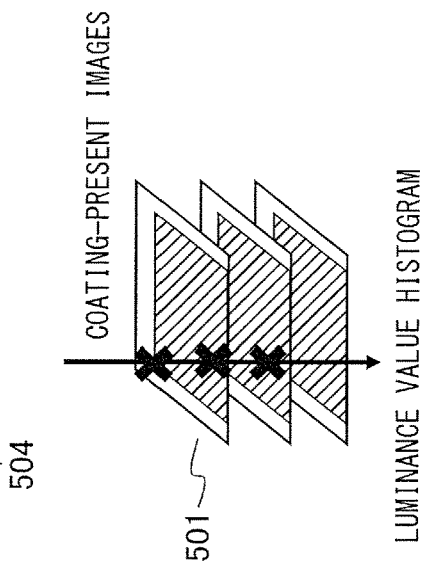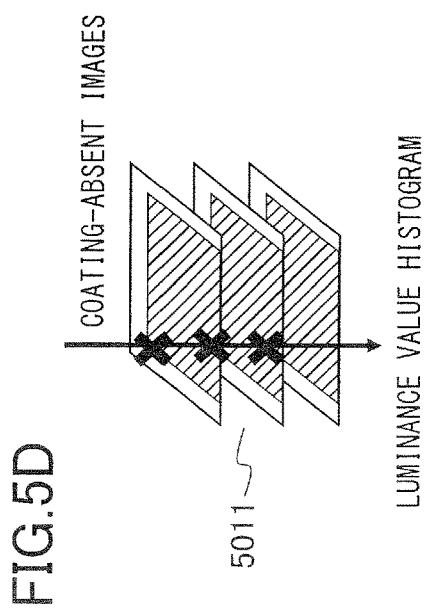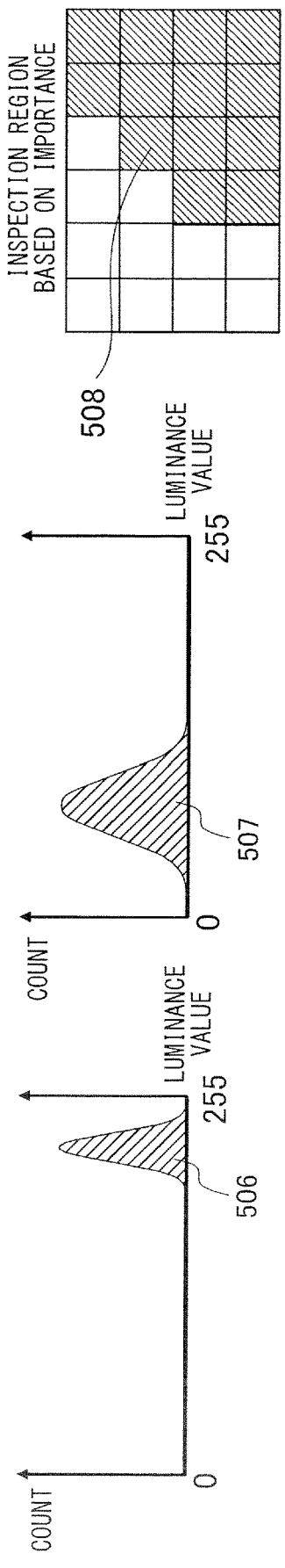

IMAGE PROCESSING METHOD AND IMAGE PROCESSING APPARATUS THAT GENERATE AN INSPECTION REGION SERVING AS A TARGET OF IMAGE PROCESSING

BACKGROUND OF THE INVENTION

Field of the Invention

The present invention relates to an image processing method and an image processing apparatus for inspecting a target object by using image processing.

Description of the Related Art

An image processing apparatus that performs inspection and measurement by using image processing is widely used for automation of inspection in a manufacturing line. There is a wide variety of inspection and measurement performed by this kind of image processing apparatus.

In this kind of image processing apparatus, an inspection/measurement target object is imaged by an image sensor, that is, a camera, image data of an inspection region is extracted from the obtained image, a feature value of the image within the inspection region is analyzed/evaluated, and thus inspection/measurement that is aimed for is performed.

For this kind of image processing apparatus, a preparation operation such as setting the inspection region needs to be performed before performing the inspection/measurement processing. Typically, a user sets an inspection region corresponding to the purpose of the inspection/measurement by using a tool for setting the inspection region.

Meanwhile, there is a demand that the time required for the setting be shortened for improving the efficiency of the setting for small-rot production of a wide variety of products. In addition, due to increase in the complexity and precision of inspection/measurement, there is a demand that the inspection region be precisely set for only a portion that should be the target of the inspection/measurement to prevent erroneous detection.

The inspection target object has a different shape depending on the individual, and also there is a case where the inspection target object is imaged in a different scale, position, or orientation each time. For example, in some cases of imaging inspection of an application state of a coating material on a product, the application state of a different shape has to be inspected each time, and there is a possibility that the inspection region needs to be reset each time when inspection of high precision is to be performed.

Conventionally, as a method of automatically determining the inspection region, an inspection region extraction method using binarization or color gamut extraction is known. In this method, a group of pixels corresponding to a preset luminance range or a preset color gamut is extracted from an image, and the group of pixels is extracted or selected as the inspection region.

This conventional method is relatively effective in the case where the contrast of luminance or color between a portion that is to be extracted as the inspection region, that is, the foreground, and the other portion, that is, the background, is high. However, in the case where the foreground portion that is an inspection target is constituted by various luminance or various colors like the case of a printed board, or where a color close to that of a foreground portion is present in the background, it is difficult to precisely extract only the foreground portion by binarization or color gamut extraction.

In view of the problem above, a method of obtaining an optimum inspection region by using a plurality of images and performing a process of enlarging, reducing, expanding, or contracting the inspection region is considered in Japanese Patent Laid-Open No. 2006-194607. In this method, an initial inspection region is set by using a plurality of images, then inspection/measurement processing is performed, and the initial inspection region is enlarged, reduced, expanded, or contracted in various directions until the result of the inspection/measurement processing reaches a predetermined level.

In addition, a method of generating an outline of the inspection region by using edge extraction to obtain an inspection region appropriate for an inspection target object in an inspection image is known, for example, as disclosed in Japanese Patent Laid-Open No. 2013-191064. In this method, an edge of the inspection target object and a region for obtaining the edge are generated in advance from an image serving as standard. Then, when the inspection image is input, an edge of the inspection target object is extracted from the inspection image by using the information, and the outline of the inspection region is generated on the basis of the edge.

According to the inspection region generation method of Japanese Patent Laid-Open No. 2006-194607 described above, when determining the inspection region, all images have to be processed each time, which requires a large throughput and takes a long time for processing in a system having a low processing capability. In addition, although an inspection region that fits the inspection target object better can be obtained by reducing the amount of enlargement/reduction or expansion/contraction, the amount of calculation increases as the amount of enlargement/reduction or expansion/contraction is reduced, which takes a longer time for processing.

In addition, according to the inspection region generation method, the edge of the inspection target object can be extracted relatively nicely by using an edge extracted by using the image serving as a standard, in the case where a similar inspection target object is inspected each time. However, in inspection such as inspection of an application state of a coating material in which an application region of a different shape is imaged each time, there is a possibility that the extraction of edge fails. As described above, in inspection in which an image of a different shape is captured each time, there is a possibility that, for example, a process of performing edge extraction and generating the outline of the inspection region needs to be performed each time, which increases the image processing time.

SUMMARY OF THE INVENTION

According to a first aspect of the present invention, an image processing method includes an identifiability value obtaining step of obtaining, for each pixel address constituting an image plane, an identifiability value for identifying which of a first inspection result and a second inspection result the pixel address corresponds to, by using a feature value of each pixel of a first image obtained by imaging a first target object for which the first inspection result has been obtained and the feature value of each pixel of a second image obtained by imaging a second target object for which the second inspection result has been obtained, an inspection region generation step of generating an inspection region serving as a target of image processing by setting a portion of the image plane including the pixel address where the obtained identifiability value satisfies a specific condition as the inspection region, and an image inspection step of performing image processing for inspection on a partial image corresponding to the inspection region among a third image obtained by imaging a third target object.

According to a second aspect of the present invention, an image processing apparatus includes an identifiability value obtaining portion configured to obtain, for each pixel address constituting an image plane, an identifiability value for identifying which of a first inspection result and a second inspection result the pixel address corresponds to, by using a feature value of each pixel of a first image obtained by imaging a first target object for which the first inspection result has been obtained and the feature value of each pixel of a second image obtained by imaging a second target object for which the second inspection result has been obtained, an inspection region generation portion configured to generate an inspection region serving as a target of image processing by setting a portion of the image plane including the pixel address where the obtained identifiability value satisfies a specific condition as the inspection region, and an image inspection portion configured to perform image processing for inspection on a partial image corresponding to the inspection region among a third image obtained by imaging a third target object.

Further features of the present invention will become apparent from the following description of exemplary embodiments with reference to the attached drawings.

BRIEF DESCRIPTION OF THE DRAWINGS

FIGS. 3A to 3E are each an explanatory diagram illustrating a target object and how inspection is performed according to the first exemplary embodiment of the present invention.

FIGS. 5A to 5F are each an explanatory diagram illustrating a method of determining an inspection region from image data according to the first exemplary embodiment of the present invention.

DESCRIPTION OF THE EMBODIMENTS

Exemplary embodiments of the present invention will be described below with reference to attached drawings. To be noted, the configurations shown below are merely examples, and, for examples, details thereof can be appropriately modified by one skilled in the art within the gist of the present invention. In addition, numerical values described in the exemplary embodiments are values for reference, and should not limit the present invention.

The following exemplary embodiments relate to an image inspection system that performs, by using an image, external appearance inspection, inspection of whether presence/absence of an attached part, inspection of application state, presence/absence, and application range of a coating material, or the like, and an inspection region setting method of automatically or semi-automatically generating an inspection region where image inspection is performed. This image inspection apparatus can be suitably used for successively inspecting a large number of products, parts, members, or the like serving as inspection targets automatically or semi-automatically regardless of the type or material thereof in a factory automation manufacturing line or the like. Particularly, in the following exemplary embodiments, an appropriate inspection region can be set by using a plurality of images captured in advance. Therefore, this can be particularly preferably applied to a case where, for example, the position and shape of the target object in the image changes each time the image is captured. Although there are a variety of purposes and inspection items for the external appearance inspection or presence/absence inspection, the inspection region setting method of the exemplary embodiments can be preferably applied to any of the inspections.

First Exemplary Embodiment

Processing Apparatus

Figure 1:
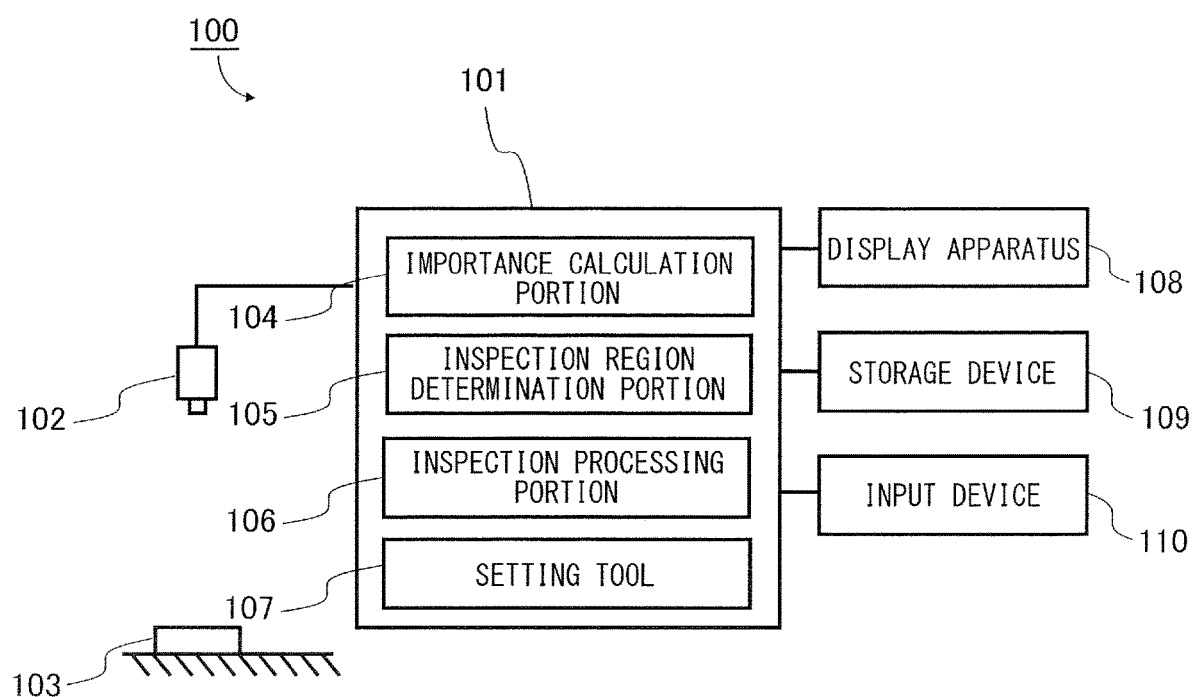
FIG. 1 is a block diagram illustrating a functional configuration of a control system of an inspection apparatus according to a first exemplary embodiment of the present invention.

FIG. 1 illustrates a functional configuration of an image processing apparatus according to a first exemplary embodiment. Hereinafter, the image processing apparatus may be also referred to as a processing apparatus for the sake of simplicity. A processing apparatus 100 of FIG. 1 is constituted by hardware including an apparatus body 101, an image sensor 102, a display apparatus 108, a storage device 109, and an input device 110, and so forth.

The image sensor 102 is a device for capturing an image of a target object 103 which is, for example, a workpiece handled in a manufacturing line, and loading a color or monochromatic still or moving image into the processing apparatus 100. For example, a digital camera having sensitivity in approximately a visible light region can be used for the image sensor 102. However, in the case of using a special image different from a visible light image such as an X-ray image, a thermographic image, or a distance image, for the inspection, an appropriate sensor suitable for the mode of inspection may be used for the image sensor 102. In the case where the processing apparatus 100 is provided in a manufacturing line of a product or the like as an image processing apparatus that performs image inspection, the image sensor 102 is disposed at a specific imaging position in the manufacturing line.

The display apparatus 108 is a display device for displaying an image captured by the image sensor 102, a result of inspection, and a graphic user interface: GUI screen for inspection processing or setting processing. For example, a liquid crystal display or a display device of different type can be used as the display apparatus 108. The storage device 109 is a device for storing various setting information, inspection results, and so forth. The processing apparatus 100 refers to the setting information in inspection processing, and examples of the setting information include inspection region information and an inspection program, stored in the storage device 109. For example, a hard disk drive: HDD, a solid state drive: SSD, a flash memory, a network storage, or the like can be used as the storage device 109. The input device 110 is a device that a user operates to input an instruction in the apparatus body 101. For example, a mouse, a keyboard, a touch panel, a dedicated console, or the like may be used as the input device 110.

The hardware of the apparatus body 101 can be constituted by a computer apparatus including a central processing unit: CPU, a random access memory: RAM serving as a main storage device, a read-only memory: ROM, an HDD, or an SSD serving as an auxiliary storage device as illustrated as an example in FIG. 9 that will be described later. In addition, functions of the apparatus body 101 include an importance calculation portion 104, an inspection region determination portion 105 serving as an inspection region generation portion, an inspection processing portion 106 serving as an image inspection portion, and a setting tool 107.

Among the functions described above, the importance calculation portion 104 and the inspection region determination portion 105 are functions for determining an inspection region for image inspection performed by the inspection processing portion 106. The setting tool 107 is a function of supporting a user performing a setting operation of setting information required for inspection processing. An example of embodiment of the setting tool 107, particularly an example of a screen displayed on the display apparatus 108 will be described with reference to FIGS. 6A to 6C that will be described later.

For example, the functions described above are realized by software of the CPU constituting the apparatus body 101, or further by some kind of hardware constituting the processing apparatus 100. For example, these functions are realized by loading a computer program stored in the auxiliary storage device or the storage device 109 into the main storage device and executing the loaded computer program by the CPU.

To be noted, FIG. 1 merely illustrates an example of an apparatus configuration, and all or part of the image sensor 102, the display apparatus 108, the storage device 109, and the input device 110 may be integrated into the apparatus body 101. The apparatus body 101 may be constituted by a personal computer: PC or a computer such as a slate-shaped terminal, or constituted by a dedicated chip or an on-board computer.

Figure 9:
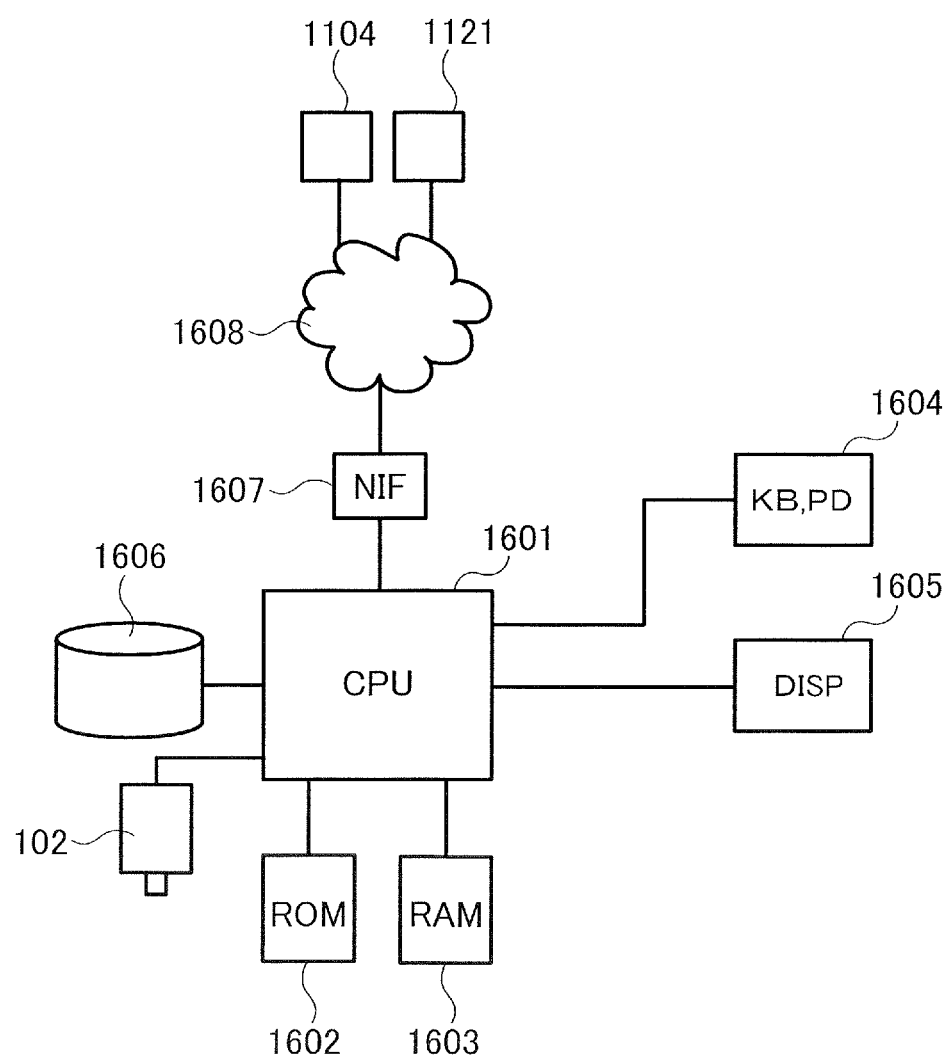
FIG. 9 is a block diagram illustrating a configuration of a control apparatus serving as a control system according to the first exemplary embodiment.

Here, a more specific configuration of the control system of FIG. 1 is illustrated in FIG. 9. The control system of FIG. 9 can be constituted by PC hardware or the like including a CPU 1601 serving as a main control unit, a ROM 1602 serving as a storage device, and a RAM 1603. An image processing program for the CPU 1601, constant information, and the like for realizing a control procedure that will be described later can be stored in the ROM 1602. In addition, the RAM 1603 is used as a work area of the CPU 1601 when executing the control procedure. Further, an external storage device 1606 is connected to the control system of FIG. 9. The external storage device 1606 is constituted by an HDD, an SSD, an external storage device of another system that is mounted via a network, or the like.

An image processing program of the CPU 1601 for realizing the control procedure of the present exemplary embodiment illustrated in, for example, FIG. 8, can be stored in a storage unit such as the external storage device 1606 constituted by an HDD, an SSD, or the like, the ROM 1602, for example, an electrically erasable programmable read-only memory: EEPROM region, or the like. In this case, the image processing program of the CPU 1601 for realizing the control procedure that will be described later can be supplied to the storage units described above via a network interface 1607 and updated to a new program, that is, to another program. Alternatively, the image processing program of the CPU 1601 for realizing the control procedure that will be described later can be supplied to the storage units described above via various storage media such as magnetic disks, optical disks, and flash memories, and drive units therefor, and thus the content thereof can be updated. The storage units, storage portions, or storage devices of various kinds in a state of storing the image processing of the CPU 1601 for realizing the control procedure constitute non-transitory computer-readable recording media storing a control procedure of the present invention.

The image sensor 102 of FIG. 1, which is a camera, is connected to the CPU 1601. Although the image sensor 102 is illustrated as being directly connected to the CPU 1601 in FIG. 9 for the sake of simplicity, the image sensor 102 may be connected to the CPU 1601 via a known camera interface or the like. In addition, the image sensor 102 may be connected via a network interface 1607 and a network 1608.

The network interface 1607 can be configured by using, for example, a communication standard of wired communication such as IEEE 802.3 or of wireless communication such as IEEE 802.11 or 802.15. The CPU 1601 can communicate with other apparatuses 1104 and 1121 via the network interface 1607. The apparatuses 1104 and 1121 correspond to, for example, integral control apparatuses such as a programmable logic controller: PLC, a sequencer, or the like, a management server, or the like disposed in a manufacturing line for production control and management.

An operation portion 1604 and a display apparatus 1605 are arranged in the control apparatus of FIG. 9 as a user interface: UI apparatus. The operation portion 1604 can be constituted by a terminal such as a handy terminal, a device such as a keyboard, a jog dial, or a pointing device, or a control terminal including these. For the display apparatus 1605, for example, a display apparatus of an arbitrary type may be used instead of the liquid crystal type as long as a data display screen that will be described later or a display screen similar thereto can be displayed thereon.

Inspection Processing

Figure 2:
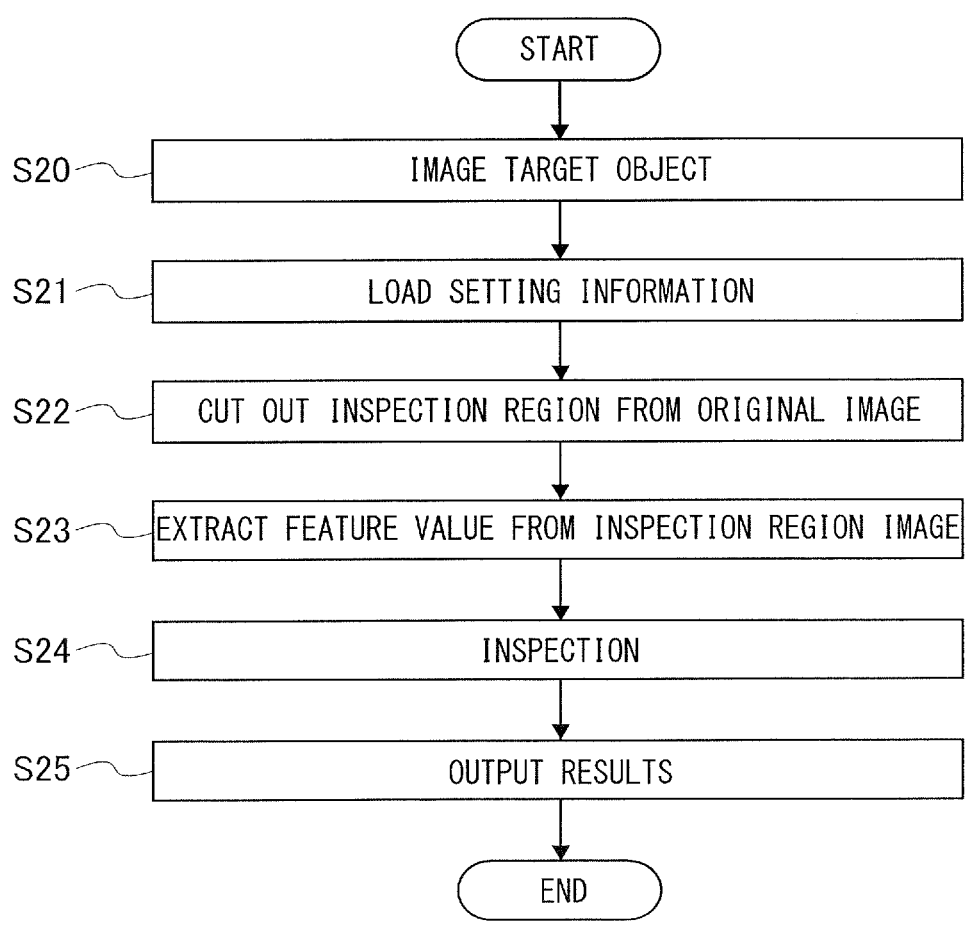
FIG. 2 is a flowchart illustrating a flow of inspection processing according to the first exemplary embodiment of the present invention.

First, inspection processing performed by the processing apparatus 100 will be described with reference to FIGS. 2 to 3E. FIG. 2 illustrates a flow of inspection processing of inspecting a target object on the basis of image processing, and FIGS. 3A to 3E illustrate how the target object is inspected. To be noted, the flow of inspection processing will be described below by taking inspection of presence/absence of, or inspection of the shape of an application region of, a coating material applied on a workpiece as an example.

In step S20 of FIG. 2, the image sensor 102 captures an image of a workpiece 301 serving as a target object 103, and the captured image data is loaded into the apparatus body 101. To be noted, in the case where an image that has been captured in advance is present in the auxiliary storage device of the apparatus body 101 or the storage device 109, the data to be inspected may be loaded from the auxiliary storage device or the storage device 109.

The image data of the target object loaded as described above is displayed on the display apparatus 108 as necessary. FIG. 3A illustrates an example of an original image without the coating material that is displayed on, for example, the display apparatus 108. In this original image, the workpiece 301 serving as a target object is captured. In this example, the target object is, for example, a circuit board, and an image capturing the workpiece 301 on which printed characters 302, wiring 303, an electronic chip 304, and the like are disposed is obtained as the original image. FIG. 3B illustrates an example of an original image in which the circuit board on which the coating material has been already applied, and a coating material 305 is applied on the workpiece 301.

In step S21, the inspection processing portion 106 loads required setting information from the storage device 109. The setting information at least includes an inspection region 306 and an inspection logic.

The inspection region 306 is a partial image region of the original image to be subjected to inspection processing using predetermined image processing. In the example of FIG. 3C, the inspection region 306 is generated in a shape that approximately entirely covers the application region of the coating material 305 but does not cover a region corresponding to the electronic chip 304. Such an inspection region 306 can be set by, for example, manual setting in which a user designates a region in a screen in which the captured image of the workpiece 301 is displayed. However, in the present exemplary embodiment, the size, position, shape, and the like of the inspection region 306 can be determined by processing that will be described later. In addition, the inspection logic is information that defines the content of the inspection processing, and examples thereof include the kinds of feature value and determination method that are to be used for the inspection, and parameters and threshold values to be used for feature value extraction and determination processing.

In step S22, the inspection processing portion 106 extracts a portion corresponding to the inspection region from the original image by using the definition of the inspection region 306 loaded in step S21, and thus generates an inspection region image.

In this kind of inspection using an image, the inspection region 306 is desirably set in such a size, position, and shape that only pixels to be inspected can be extracted without excess or deficiency. When excess pixels are included in the inspection region 306, the excess pixels may cause noises to degrade the inspection accuracy, and conversely, when the inspection region 306 is smaller than a range that should be inspected, the inspection may be incomplete.

However, in images in captured data, the position and shape of the target object are not necessarily always the same. For example, FIGS. 3D and 3E illustrate an example of a target object in a different workpiece. In this example, printed characters 307 and an electronic chip 309 disposed on the workpiece are displaced and inclined, and the amount and shape of a coating material 308 are different. Therefore, as illustrated in FIG. 3E, an actual application region 310 of the coating material is displaced from an inspection region of the same shape as the inspection region 306 of FIG. 3C. In the case where there is a possibility that such change occurs, for example, for each captured image, there is a possibility that sufficient inspection cannot be performed by only performing image processing on the inspection region. Therefore, in the present exemplary embodiment, an appropriate inspection region is set by using a plurality of images with or without the coating material that are captured in advance as will be described later.

In step S23, the inspection processing portion 106 extracts a required feature value in accordance with the inspection logic by using an inspection region image cut out from the inspection region 306 in step S22. For example, as a feature value for inspecting presence/absence of the coating material 305, the area or a color feature value of the portion corresponding to the coating material 305 is extracted.

Next, in step S24, the inspection processing portion 106 performs inspection processing in accordance with the inspection logic. For example, in the case where the feature value of the area or color feature value of the coating material 305 obtained in step S23 is abnormal, it is determined that the coating material is absent.

In step S25, the inspection processing portion 106 performs output processing of displaying an inspection result on the display apparatus 108 or storing the inspection result in the storage device 109. In this manner, the inspection processing on the workpiece 301 is completed.

The image processing apparatus configured as described above can be used as an inspection apparatus that performs inspection processing of, for example, inspecting presence/absence of a different member attached to the workpiece or inspecting the application state of the coating material on the workpiece. Manufacturing apparatuses that perform manufacturing processes such as machining, assembly, and conveyance of the workpiece are placed in the manufacturing system, that is, the manufacturing line, by using the inspection result obtained by the image processing apparatus, and the workpiece after completing a specific step in the manufacturing processes is inspected by the image processing apparatus.

In such a manufacturing system, that is, manufacturing line, the image processing apparatus of the present exemplary embodiment can be caused to repeatedly perform the inspection processing described above on workpieces serving as target objects that are conveyed successively. The inspection result of this can be, for example, input to the manufacturing apparatuses, and used for causing the manufacturing apparatuses to perform machining again or perform correction machining on the basis of the inspection result. In addition, in the case where the manufacturing apparatus is a conveyance apparatus that switches a conveyance destination between good and defective products, the conveyance apparatus can be caused to perform the switching of the conveyance destination between good and defective products by using the inspection result obtained by the image processing apparatus described above.

Setting of Inspection Region

Figure 4:
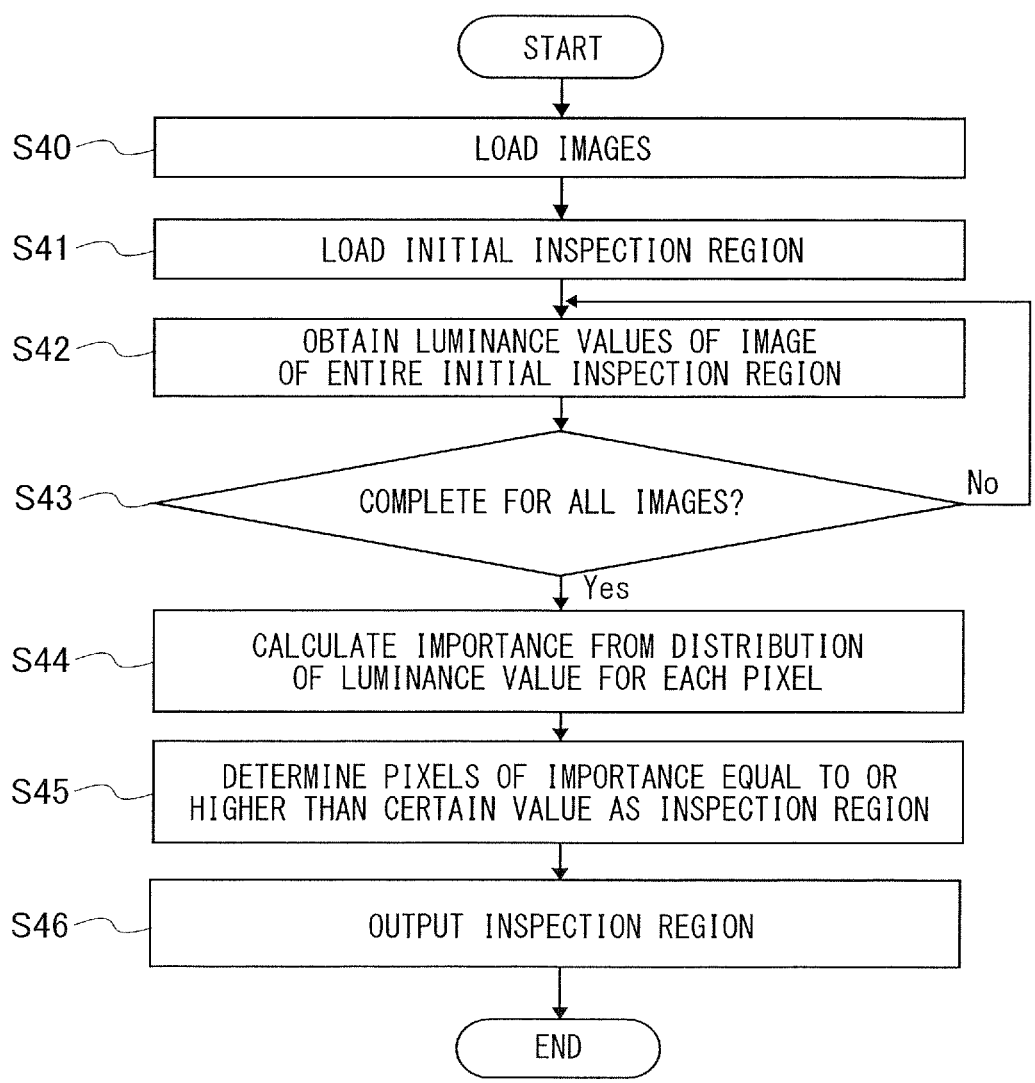
FIG. 4 is a flowchart of inspection region setting according to the first exemplary embodiment of the present invention.

An operation of the processing apparatus 100 concerning setting of the inspection region will be described with reference to FIGS. 4 to 5F. FIG. 4 illustrates a flow of inspection region setting in the processing apparatus. In addition, FIGS. 5A to 5F are diagrams for describing a method of generating an inspection region from image data.

In step S40 of FIG. 4, the inspection region determination portion 105 obtains a group of images constituted by a plurality of images for determining the inspection region from the storage device 109. Alternatively, image data obtained by imaging the workpiece 301 by the image sensor 102 may be used.

Here, for example, a workpiece such as a circuit board is set as a target object for the inspection, and the application state of the coating material on the target object is inspected by image processing. In this image inspection, OK determination indicating a good product, that is, inspection passing determination is made as a first inspection result, for example, in the case where the coating material is applied in a predetermined application region. This case corresponds to presence of the coating material. In addition, NG determination indicating a defective product, that is, inspection non-passing determination is made as a second inspection result in the case where a predetermined application state is not obtained. This case corresponds to absence of the coating material. To be noted, in the description below, a first image capturing a target object of OK determination indicating a good product may be also referred to as an OK image, and a second image capturing a target object of NG determination indicating a defective product may be also referred to as an NG image.

In the present exemplary embodiment, the group of images read from the storage device 109 in step S40 includes a plurality of OK images capturing a target object with the coating material, that is, a good workpiece, and a plurality of NG images capturing a target object without the coating material, that is, a defective workpiece. Although the number of one of the OK images and the NG images may be at least one, it is preferable that the numbers of both of the OK images and the NG images that are input are two or more.

In FIG. 5A, 501 denotes an example of an OK image capturing a target object with the coating material, that is, a good workpiece. To be noted, the OK images and the NG images may be obtained by imaging target objects with the coating material, that is, good workpieces, and target objects without the coating material, that is, defective workpieces, in advance. Inspection of whether the target objects captured in these images are good or defective products is performed by, for example, visual observation. Alternatively, a system in which, when inputting images capturing the target objects with/without the coating material, the images are displayed one by one on the display apparatus 108 or 1605, and a user makes the OK/NG determination by using the input device 110 may be employed. The OK images and the NG images are associated with flags or the like indicating the inspection results of OK/NG and are loaded onto the storage device 109, for example, the RAM 1603, in a format identifiable by the CPU 1601 in subsequent processing.

In step S41, the inspection region determination portion 105 loads setting of an initial inspection region 502 illustrated in FIG. 5B. The initial inspection region 502 may be set by a user roughly designating an inspection target portion, or setting the entire region of the image as the initial inspection region. In FIG. 5C, 503 denotes an enlarged portion of the initial inspection region 502, and each block therein corresponds to one pixel of the image.

In step S42, the inspection region determination portion 105 obtains a luminance value as a feature value for generating the inspection region from each pixel address of the initial inspection region 502 of the image, and loads the obtained luminance value onto the storage device 109, for example, the RAM 1603. This processing is repeatedly performed on all of the input OK and NG images. The OK images correspond to presence of the coating material and the NG images correspond to absence of the coating material.

In the case where the processing of obtaining the luminance value described above has been performed on all of the OK and NG images, that is, in the case where the result of step S43 is Yes, the process proceeds to step S44, and the importance calculation portion 104 calculates the importance of each pixel address on the basis of the luminance values of the OK and NG images. This identifiability value obtaining step corresponds to a function of the importance calculation portion 104 serving as an identifiability value obtaining portion.

In the present exemplary embodiment, a specific "pixel address" corresponds to a position of the same specific field angle in an image plane of the OK images corresponding to presence of the coating material and the NG images corresponding to absence of the coating material. One block in FIG. 5C or FIGS. 5E and 5F corresponds to the "pixel address".

FIG. 5D illustrates how luminance values of a specific pixel in a plurality of OK images 501 and NG images 5011 are obtained as histograms illustrated in a lower portion of FIG. 5D. Two histograms shown in lower left and lower right portions of FIG. 5D respectively correspond to a luminance distribution 506 of a specific pixel in the plurality of NG images corresponding to absence of the coating material and a luminance distribution 507 of the same specific pixel in the plurality of OK images corresponding to presence of the coating material. This pixel is included in, for example, the predetermined application region of the coating material, and an object of a different luminance is captured in this pixel address between the case where the coating material is present and the case where the coating material is absent. In addition, in this example, the coating material is a material reflection light on which has a lower luminance than that of a surface without the coating material such as the surface of the board, and the luminance values of medians of the two luminance histograms of the specific pixel are very distant from each other. In addition, due to unevenness of the coating material or the like, the variety of the luminance value of the specific pixel in the OK images corresponding to presence of the coating material is larger than in the case of the NG images corresponding to absence of the coating material in which approximately the same board surface or the like is captured. Conversely, in a specific pixel address where a board surface not related to the application region is captured, the distribution of the luminance histogram has a similar median value and a similar variance in both of the case of the OK images corresponding to presence of the coating material and the case of the NG images corresponding to absence of the coating material.

In the present exemplary embodiment, the nature described above is used, and a high importance value serving as an identifiability value is assigned to a pixel whose feature value distribution, for example, luminance value distribution differs greatly between the OK images corresponding to presence of the coating material and the NG images corresponding to absence of the coating material.

In FIG. 5E, 505 denotes the importance value serving as an identifiability value of each pixel address obtained on the basis of luminance value data. The importance illustrated in FIG. 5E and calculated for each pixel address of the entirety of the inspection region in this manner is held on the RAM.

The importance value calculated for each pixel address in this manner corresponds to an identifiability value for identifying an OK image corresponding to presence of the coating material from an NG image corresponding to absence of the coating material. In the present exemplary embodiment, a higher importance value serving as an identifiability value is imparted to a pixel address where an OK image corresponding to presence of the coating material can be distinguished better from an NG image corresponding to absence of the coating material.

Various methods for obtaining the importance Im can be considered. For example, as expressed in the following formula (1), a method of setting a luminance difference between an average luminance Lem of the OK images and an average luminance Lnm of the NG images as the importance can be considered.

$$Im = Lem - Lnm \tag{1}$$

In addition, a method of setting a value obtained by dividing the luminance difference between the average luminance Lem of the coating-present images and the average luminance Lnm of the coating-absent images by the sum of respective variance values Gem and σnm thereof as the importance as expressed in the following formula (2) can be considered.

$$Im=|Lem-Lnm|/(\sigma em+\sigma nm) \quad (2)$$

Also, a method of setting a value obtained by dividing the maximum value max(Lei−Lnj) of the luminance difference between the coating-present image and the coating-absent image by the minimum value min(Lei−Lnj) thereof as the importance as expressed in the following formula (3) can be considered.

$$Im=\max(Lei-Lnj)/\min(Lei-Lnj) \quad (3)$$

Further, a method of performing determination analysis processing by a determination analysis method of classifying the OK images and the NG images, for example, Otsu's binarization, is performed, and setting the maximum value of a value obtained by dividing an in-class variance by an inter-class variance as expressed by the following formula (4) and serving as an evaluation standard as the importance can be considered.

$$Im=\max(\sigma_b^2/\sigma_w^2) \quad (4)$$

To be noted, although a case where the luminance is used as a feature value in the importance calculation expressed by the formulae (1) to (4) described above has been described as an example, the importance can be calculated in a similar manner also in the case of using another feature value, for example, a hue value of the pixel. In addition, the methods of importance calculation described above are merely examples, and an arbitrary calculation method can be used as long as the importance can be calculated by using the luminance distributions in the coating-absent image group and the coating-present image group as an indicator of the identifiability value indicating how well the first and second inspection results can be distinguished.

In step S45, the inspection region determination portion 105 serving as an inspection region generation portion generates a partial image region including pixels of importance equal to or higher than a certain value as an inspection region 508. FIG. 5F illustrates a case where a partial image region including pixels whose importance calculated in FIG. 5E are 40 or higher is generated as the inspection region 508. In step S46, the inspection region determination portion 105 stores the determined inspection region 508 in the storage device 109.

As described above, in the processing steps executed by the inspection region determination portion 105, the luminance values in the initial inspection region are obtained by using the plurality of OK images corresponding to presence of the coating material and the plurality of NG images corresponding to absence of the coating material. Then, by a calculation method such as ones expressed by the formulae (1) to (4) described above, the importance value serving as an identifiability value corresponding to the distribution state of the luminance value is calculated for each pixel address. Then, a partial image region including pixel addresses having importance values serving as identifiability values satisfying a specific condition is determined as the inspection region. For example, a partial image region including pixel addresses having importance values serving as identifiability values equal to or higher than a certain value is determined as the inspection region.

Figure 6A:
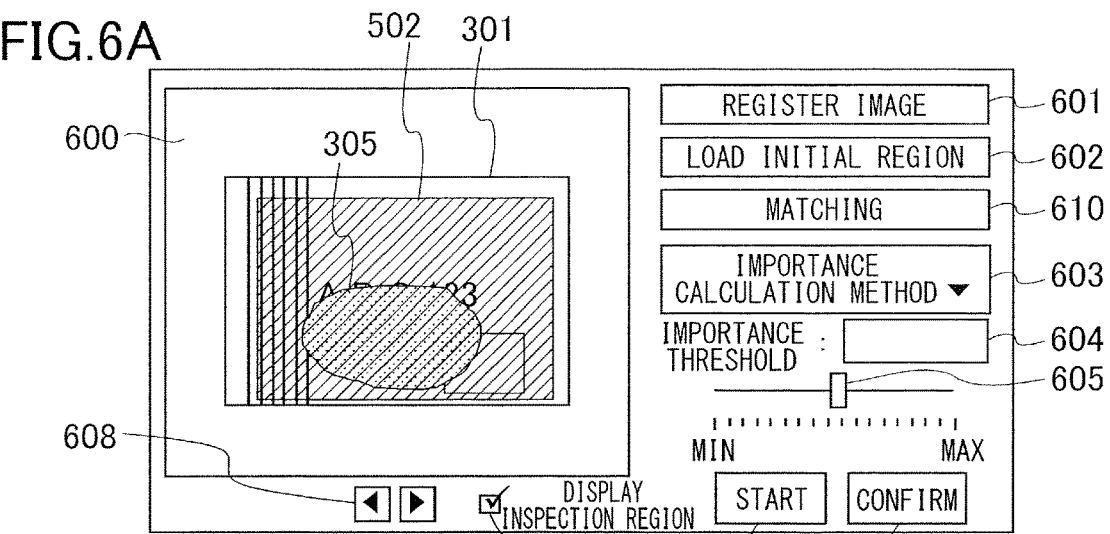
FIGS. 6A to 6C are each an explanatory diagram illustrating an example of a setting screen for an inspection region according to the first exemplary embodiment.
Figure 6B:
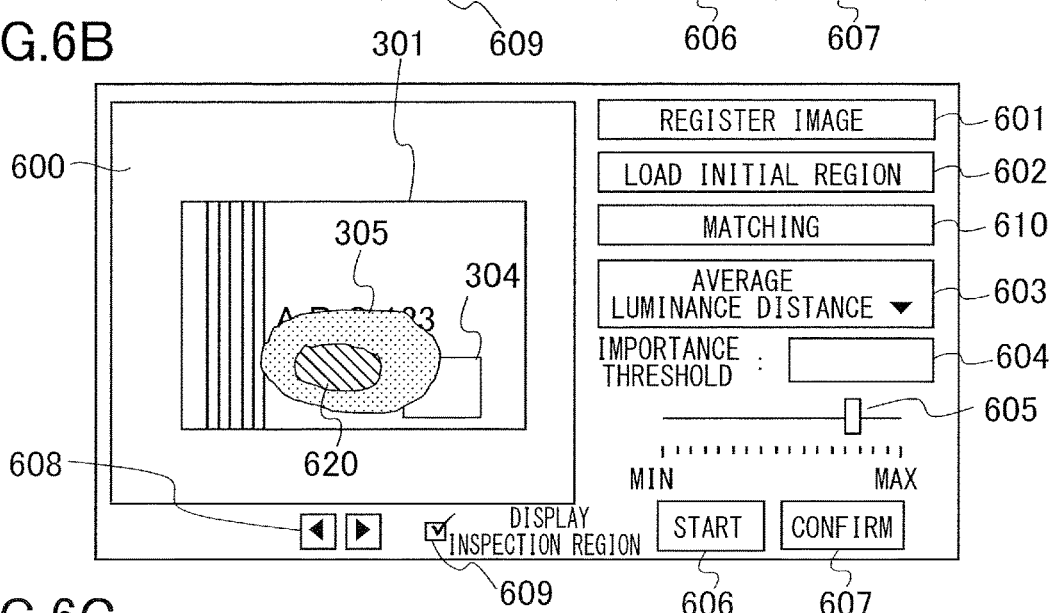
Figure 6C:
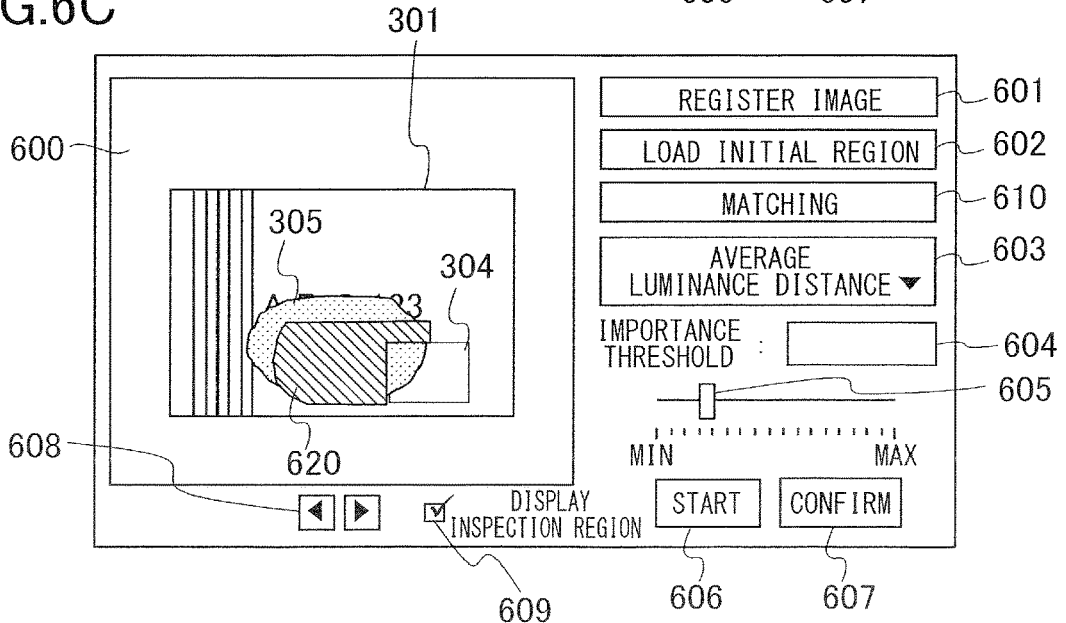

Here, an example of a user interface constituting the setting tool 107 for supporting a user in the case of performing the inspection region generation described above will be described with reference to FIGS. 6A to 6C. FIGS. 6A to 6C illustrate an example of configuration of a display screen of the display apparatus 108 or 1605 that can be operated by a keyboard or a pointing device such as a mouse of the input device 110 serving as the operation portion 1604.

When the setting tool 107 is activated, a setting screen illustrated in FIG. 6A is displayed on the display apparatus 108. This setting screen includes an image window 600, an image registration button 601, and an initial region loading button 602. In addition, this setting screen includes, as user interface related to the importance, an importance calculation method selection box 603, an importance threshold setting box 604, and an importance threshold setting slide bar 605. Further, this setting screen includes, as user interface related to progress of the processing, a processing start button 606, a region determination button 607, an image switching button 608, and a region display check box 609. To be noted, a matching button 610 is used for activating identification and correction processing of a position and a phase of a target object in the image by using pattern matching that will be described later in a second exemplary embodiment.

A user can perform selection from these buttons, input to a text/number input box, operation of the slide bar, and the like by using a keyboard or a pointing device such as a mouse of the input device 110. To be noted, the setting screen of FIGS. 6A to 6C is merely an example, and any UI may be used as long as input of parameters and recognition of the inspection region that will be described below can be performed through the UI.

When the image registration button 601 is pressed, the setting tool 107 input the group of images constituted by the plurality of OK images corresponding to presence of the coating material and the plurality of NG images corresponding to absence of the coating material from the storage device 109. One of the group of images input herein is displayed in the image window 600 of the setting screen as illustrated in FIG. 6A.

In addition, the user can switch the image displayed in the image window 600 among the input group of images by pressing the image switching button 608. In addition, when the initial region loading button 602 is pressed, the setting tool 107 loads data of the initial inspection region 502 preset for the image from the storage device 109. The format of the data of the initial inspection region 502 may be any format, and the entire region of the image, that is, the entire field angle may be used as the initial inspection region 502 as described above.

As illustrated in FIG. 6A, the inspection region 502 is superimposed on the image in the image window 600 of the setting screen. In addition, ON/OFF of the superimposition of the initial inspection region 502 is switched by operating the region display check box 609.

An importance calculation method is selected from the importance calculation method selection box 603. The importance calculation method selection box 603 can be implemented in the form of a pull-down or pull-up menu or a text input box. The user selects a different importance calculation method among, for example, the formulae (1) to (4) described above, by using the importance calculation method selection box 603.

When the processing start button 606 is pressed, importance calculation processing on pixels in the initial inspection region 502 is performed for the registered group of images. To be noted, an operation of pressing the processing start button 606 without determining the initial inspection region 502 may be allowed. In this case, the entire region of the image is automatically set as the initial inspection region, and the importance calculation processing is performed on each pixel in the entire region of the image. If the user interface is configured such that the initial inspection region 502 is selectable, a region in the field of view that a user can determine as a region obviously not requiring inspection can be excluded from the importance calculation processing, which leads to a possibility of accelerating the importance calculation processing.

When the importance calculation processing is completed, as illustrated in FIG. 6B, a group of pixels having importance values serving as identifiability values equal to or higher than a value designated via the importance threshold setting box 604 is superimposed as an inspection region 620 on the image in the image window 600 of the setting screen. In this case, an importance threshold value is configured to be changeable by a user rewriting a value in the importance threshold setting box 604 or moving the importance threshold setting slide bar 605 to the left or the right. In addition, the importance calculation method selection box 603 is configured such that the user can change the importance calculation method as described above. When the importance calculation method or the importance threshold value is changed by such a GUI, as illustrated in FIG. 6C, the shape, position, and size of the inspection region 620 displayed in the image window 600 are updated.

According to the user interface described above, the shape, position, and size of the generated inspection region 620 are automatically updated in the displayed screen. With such a screen of the setting tool 107, the user can recognize the shape, position, size, and the like of the inspection region 620 at a glance.

To be noted, an user interface through which the inspection region 620 can be deformed or another inspection region 620 can be added in the case where a region the user desires to include in the inspection region 620 is not included in the inspection region 620 even if the importance calculation method or the importance threshold value is changed may be further provided. Such an inspection region editing user interface can be implemented by a GUI for deforming or adding the inspection region 620 through an operation of a pointing device such as a mouse.

When a desired inspection region 620 is obtained in the image window 600 in this manner, the user confirms the inspection region 620 by the region determination button 607. When this operation is performed, inspection region definition information corresponding to the inspection region 620 that is currently superimposed on the image in the image window 600 is generated. The data format of this inspection region definition information can be arbitrarily selected, and the generated inspection region definition information is stored in the storage device 109, the external storage device 1606, or the like.

As described above, according to the present exemplary embodiment, the importance of each pixel of the image captured by the image sensor 102 for the inspection can be calculated by using OK images and NG images of a certain number prepared in advance. This importance value corresponds to an identifiability value for identifying an OK image or an NG image respectively corresponding to the first and second inspection results in the position, that is, address, of each pixel. Further, an inspection region including pixels whose importance satisfies a predetermined condition, for example, pixels whose importance values serving as identifiability values are equal to or higher than a predetermined threshold value can be automatically generated. Therefore, even in the case of inspecting a target object of a different shape each time, a portion of the background whose color is similar to that of the target object is not automatically set as the inspection region, and only pixels that differ greatly between OK images and NG images can be set as the inspection region, by preparing a sufficient number of images. Therefore, removal of the background portion or the like in the inspection region does not have to be performed in subsequent inspection processing, and thus quick, highly precise, and robust image inspection can be performed. That is, according to the present exemplary embodiment, an appropriate inspection region with which erroneous detection is unlikely to occur can be set quickly and automatically even in the case of inspecting a target object whose position or the like in the captured image is different each time.

According to the image processing method and the image processing apparatus of the exemplary embodiment, quick, highly precise, and robust inspection can be executed by using the appropriately set inspection region. A highly reliable manufacturing line can be established by arranging manufacturing apparatuses that control machining, assembly, conveyance, and the like of the workpiece, by using results of inspection performed by the image processing method and the image processing apparatus.

Second Exemplary Embodiment

A second exemplary embodiment of the present invention will be described with reference to FIGS. 7 to 8B. The difference from the first exemplary embodiment is that correction in the case where the position of the workpiece including the target object, that is, the position and phase of the target object is different for each captured image is included. In the second exemplary embodiment, processing of specifying and correcting the position and phase of the target object is added. The other elements and processing are the same as in the first exemplary embodiment. In the present exemplary embodiment, for example, an image processing technique such as pattern matching processing or affine transformation is used for the specification and correction of the position and phase.

Figure 7:
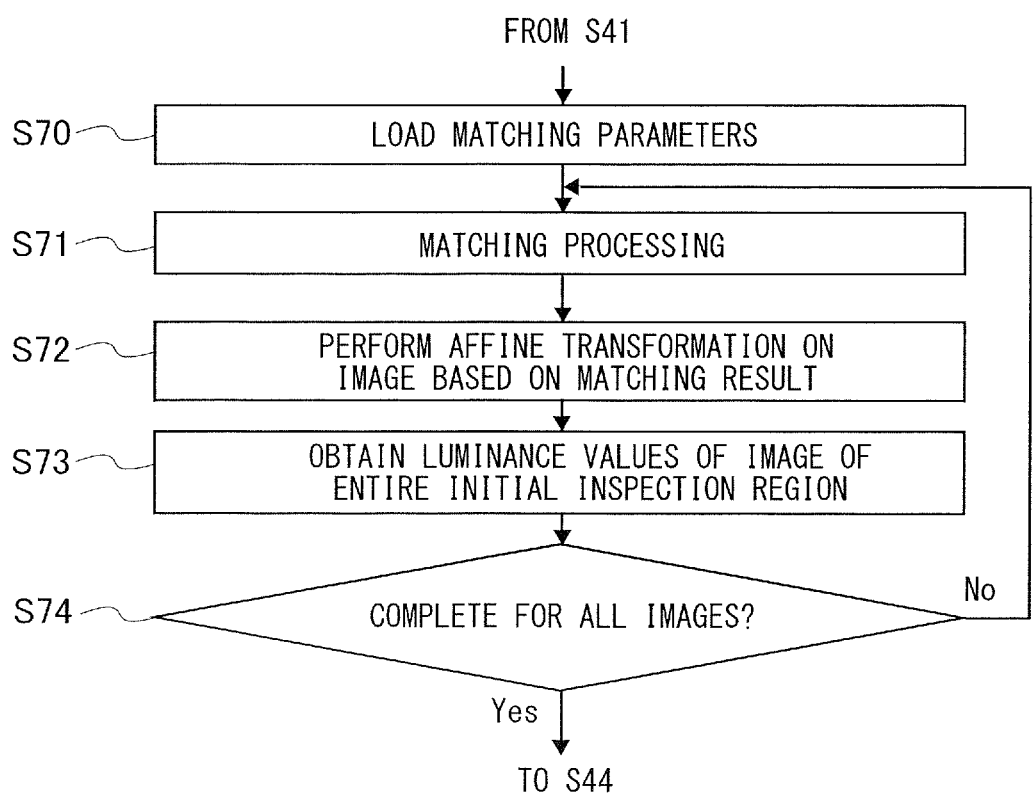
FIG. 7 is a flowchart of inspection region setting according to a second exemplary embodiment of the present invention.

FIG. 7 illustrates processing of the second exemplary embodiment that should replace steps S42 and S43 of the flow of the first exemplary embodiment illustrated in FIG. 4. As has been described for steps S40 and S41 of FIG. 4, the inspection region determination portion 105 of FIG. 1 loads the target object image and the initial inspection region similarly to the first exemplary embodiment.

Next, in step S70 of FIG. 7, the inspection region determination portion 105 loads matching parameters for matching processing. Examples of the matching parameters include a score threshold value, a searching angle, a searching scale, and a searching region of pattern matching.

Next, in step S71, the inspection region determination portion 105 performs pattern matching processing. This pattern matching processing is matching processing between the image subjected to processing, which is one of the OK and NG images, and a shape pattern of a template image or model image of the target object or a part of the target object that is prepared in advance. The details of this processing will be described later.

Next, in step S72, the inspection region determination portion 105 performs affine transformation on the image on the basis of the result of the matching. As a result of this, the positions and phases of the target object in the OK images or NG images are aligned on the basis of the template image.

In step S73, the inspection region determination portion 105 obtains luminance values of the initial inspection region 502 of the image and loads the luminance values onto the RAM. This processing is repeatedly performed on all images. When the processing is completed for all the images, that is, when the result of step S74 is Yes, the process proceeds to step S44 of FIG. 4. The subsequent steps are the same as in the first exemplary embodiment.

In the manner described above, the positions and phases of the target object in the OK images or NG images can be specified and, for example, corrected to coincide with one another on the basis of the template image. By this correction processing, it is guaranteed that a pixel of the same pixel address in the images captures the same portion of the target object. Therefore, the importance value serving as an identifiability value of each pixel can be calculated more precisely.

Pattern Matching

Figure 8A:
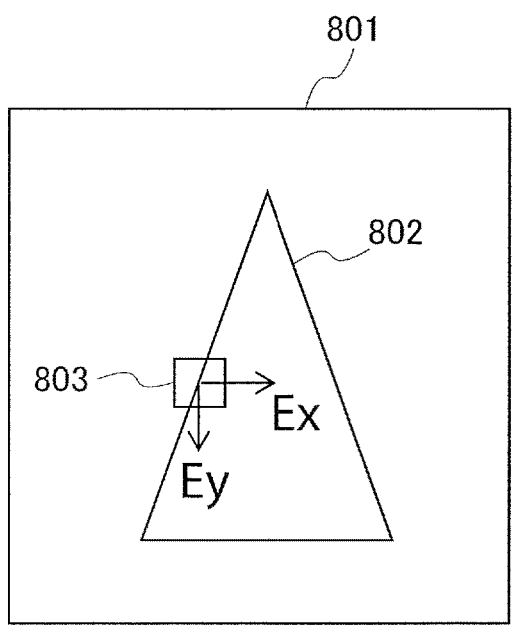
FIGS. 8A and 8B are each an explanatory diagram illustrating a method of extracting an edge from image data.
Figure 8B:
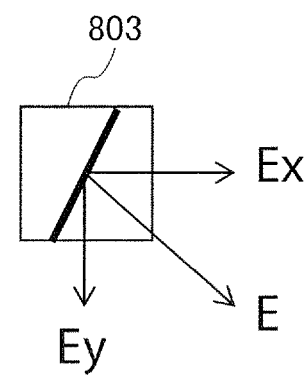

The pattern matching processing performed in step S71 of FIG. 7 can be executed via, for example, edge detection processing as illustrated in FIGS. 8A and 8B. In image data 801 illustrated in FIG. 8A, a target object 802 schematically illustrated as a triangle is captured. In the pattern matching using edge extraction, an edge intensity in a pixel of interest 803 is evaluated. FIG. 8B illustrates edge intensity that is edge information characterizing the nature of the edge at the pixel of interest 803 included in one of oblique sides of the target object 802 illustrated in FIG. 8A.

The pattern matching processing using edge intensity information is processing of searching for a position at which similarity to the template image serving as a standard image registered in advance is the highest in the searching region. In the case where the similarity between the input image and the standard image at the searched position, that is, the matching score, is higher than a score threshold value, the matching processing is successful. Then, among the positions where the matching processing is successful, a position with the highest score is output as a matching position. Pattern matching processing between an edge image extracted from a workpiece image and the standard image will be described herein.

As illustrated in FIG. 8A, among all the pixels of the workpiece image, pixels whose gradient intensity E is equal to or higher than a threshold value, that is, an edge is extracted. In this edge extraction, the gradient intensity and gradient direction of luminance are calculated for all the pixels of the workpiece image. The gradient intensity is calculated by using a sobel filter of an x direction and a sobel filter of a y direction. An x-axis direction gradient intensity Ex and a y-axis direction gradient intensity Ey are calculated for each pixel.

Then, as illustrated in FIG. 8B, the final gradient intensity E of the target object in each image, which is an oblique side of the triangle, can be calculated as a square root of sum of squares of the x-axis direction gradient intensity Ex and the y-axis direction gradient intensity Ey, for example, as expressed by the following formula (5).

$$E = \sqrt{Ex^2 + Ey^2} \quad (5)$$

In addition, at this time, a gradient direction θ can be calculated by the following formula (6) by using the x-axis direction gradient intensity Ex and the y-axis direction gradient intensity Ey.

$$\theta = \tan^{-1}\left(\frac{Ey}{Ex}\right) \quad (6)$$

Then, the edge of the workpiece image is extracted by selecting pixels whose gradient intensity E is equal to or higher than a predetermined threshold value among all the pixels of the workpiece image. Next, pattern matching processing is performed between the extracted edge and one standard image to evaluate the standard image. Further, the matching score Sij of the standard image at a detected position (i, j) can be calculated pixel by pixel by using the following formula (7) for all the pixels of the extracted edge in the image data.

$$S_{ij} = \frac{1}{N}\sum_{k=0}^{N-1} S_k \quad (7)$$

Here a local score Sk is a score calculated for each model edge point of a candidate model, and is calculated by the following formula. In the following formula (8), θTk is a gradient direction of each edge point of the extracted edge, and θMk is a gradient direction of each edge point of the model edge.

$$S_k = \cos(\theta_{Tk} - \theta_{Mk})) \quad (8)$$

Here, the local score Sk and the matching score Sij each take a value of −1 to +1, and the value being closer to 1 means that the level of pattern matching is higher.

In this manner, pattern matching of S71 of FIG. 7 can be performed via edge extraction. The affine transformation of step S72 of FIG. 7 performed subsequently to the pattern matching is performed after setting parameters related to translational movement and rotation of the image to such values that the matching score with the template image becomes the highest. In this manner, the position and phase of the target object can be specified and corrected such that the position and phase of the target object is the same in all the images.

As described above, the inspection region generation can be performed after correcting the position and phase of the target object captured in the OK images or NG images by using the pattern matching, and thus the inspection region that can be used more highly precisely and more robustly can be generated. That is, according to the second exemplary embodiment, an effect similar to that of the first exemplary embodiment can be achieved with higher precision. The process illustrated in FIG. 7 is a process to which processing of specifying and correcting the position and phase of the workpiece is added, and can be preferably applied to a case where the position of the workpiece including the target object differs between images.

The processing of specifying and correcting the position and phase of the target object using the pattern matching of the second exemplary embodiment may be configured to be activated and deactivated in accordance with various conditions. For example, the matching button 610 illustrated in FIGS. 6A to 6C is provided as an operation portion for determining whether or not the processing of specifying and correcting the position and phase of the target object using pattern matching is to be performed when generating the inspection region. By preparing a user interface like this matching button 610, the user can determine whether or not to perform the processing of specifying and correcting the position and phase of the target object using pattern matching, in accordance with the situation when the inspection region is generated. For example, the activation/deactivation operation of the matching button 610 can be selected in consideration of change in the position and phase of the workpiece in the manufacturing line where the inspection is performed, change in the position and phase of the workpiece captured in the OK images or NG images used for generation of the inspection region, and the like.

To be noted, in the second exemplary embodiment described above, shape matching focused on the edge has been described as an example of feature-based matching processing. However, the method of specifying the position and phase of the target object in the image is not limited to this. For example, feature-based matching may be used for specifying and correcting the position and phase of the target object, or matching processing focusing on a corner or the like may be used. In addition, area-based matching may be used for specifying and correcting the position and phase of the target object, or a method of specifying the position and phase of the workpiece by performing binarization while changing the threshold value for the binarization may be used.

The exemplary embodiments described above are specific examples of the present invention, and the scope of the present invention should not be limited to the specific examples.

Although the luminance value of the pixel has been used as a feature value used for calculation of the importance value serving as an identifiability value of the pixel in the exemplary embodiments described above, a two-dimensional histogram of color, that is, a color space, or a multi-dimensional histogram of color including hue, saturation, and luminance may be used.

To be noted, although all the pixels whose importance is higher than a threshold value has been included in the inspection region in the exemplary embodiments described above, only a region of the largest area may be set as the inspection region after joining and dividing regions, or the user may be let designate the inspection region. In addition, noise reduction processing may be performed. For example, opening processing or closing processing that appropriately performs a required process in accordance with the purpose may be added before or after the image processing or the inspection region determination processing. In addition, although an original image has been used in the exemplary embodiments described above, a method of reducing the amount of calculation by using a reduced image may be employed. In addition, although the importance value serving as an identifiability value has been used for determining the inspection region in the first and second exemplary embodiments described above, processing of, by using the same indicator, treating a portion whose importance value serving as an identifiability value is low as a standard region, for example, a region where the luminance value does not change between the coating-present image and the coating-absent image may be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-198743, filed on Oct. 22, 2018, which is hereby incorporated by reference herein in its entirety.

What is claimed is:

1. An image processing method comprising:
an identifiability value obtaining step of obtaining, for each pixel address constituting an image plane, an identifiability value for identifying to which of a first inspection result and a second inspection result the pixel address corresponds, by using a feature value of each pixel of a first image obtained by imaging a first target object for which the first inspection result has been obtained and the feature value of each pixel of a second image obtained by imaging a second target object for which the second inspection result has been obtained;
an inspection region generation step of generating an inspection region serving as a target of image processing by setting a portion of the image plane including the pixel address when the obtained identifiability value satisfies a specific condition as the inspection region; and
an image inspection step of performing image processing for inspection on a partial image corresponding to the inspection region among a third image obtained by imaging a third target object.

2. The image processing method according to claim 1, wherein the feature value of a pixel is a luminance value of the pixel.

3. The image processing method according to claim 1, wherein the feature value of a pixel is a hue value of the pixel.

4. The image processing method according to claim 1, wherein the feature value of a pixel of an image is a luminance difference between an average luminance of the image and a luminance of the pixel.

5. The image processing method according to claim 1, wherein the identifiability value obtaining step comprises:

calculating a first average value of the feature value for each pixel address by using a plurality of images including the first image and obtained by imaging target objects for which the first inspection result has been obtained;

calculating a second average value of the feature value for each pixel address by using a plurality of images including the second image and obtained by imaging target objects for which the second inspection result has been obtained; and obtaining, for each pixel address constituting the image plane, a difference between the first average value and the second average value as the identifiability value.

6. The image processing method according to claim 1, wherein the identifiability value obtaining step comprises:

calculating, for each pixel address, a first average value that is an average value of the feature value and a first variance value that is a variance value of the feature value, by using a plurality of images including the first image and obtained by imaging target objects for which the first inspection result has been obtained;

calculating, for each pixel address, a second average value that is an average value of the feature value and a second variance value that is a variance value of the feature value, by using a plurality of images including the second image and obtained by imaging target objects for which the second inspection result has been obtained; and obtaining, for each pixel address constituting the image plane, a value obtained by dividing a difference between the first average value and the second average value by a sum of the first variance value and the second variance value, as the identifiability value.

7. The image processing method according to claim 1, wherein the identifiability obtaining step comprises:

calculating, for each pixel address constituting the image plane, a difference between the feature value of one of a plurality of first result images and the feature value of one of a plurality of second result images, for all combinations of the plurality of first result images and the plurality of second result images, the plurality of first result images including the first image and being obtained by imaging target objects for which the first inspection result has been obtained, the plurality of second result images including the second image and being obtained by imaging target objects for which the second inspection result has been obtained; and obtaining, as the identifiability value, a value obtained by dividing a maximum value of the difference by a minimum value of the difference.

8. The image processing method according to claim 1, wherein the first inspection result corresponds to a target object passing inspection and the second inspection result corresponds to a target object not passing inspection.

9. The image processing method according to claim 1, wherein an image obtained by correcting a position and a phase of the first target object in an image obtained by imaging the first target object is used as the first image, and an image obtained by correcting a position and a phase of the second target object in an image obtained by imaging the second target object is used as the second image.

10. The image processing method according to claim 1, further comprising a step of inspecting, on a basis of a result of the image inspection step, a state of a coating material applied on the third target object.

11. The image processing method according to claim 1, further comprising a step of inspecting, on a basis of a result of the image inspection step, a state of a part attached to the third target object.

12. The image processing method according to claim 1, wherein the identifiability value obtaining step further comprises a user interface step of displaying a setting screen on a display apparatus.

13. The image processing method according to claim 1, wherein the inspection region generation step further comprises a user interface step of displaying a setting screen on a display apparatus.

14. A non-transitory computer-readable recording medium storing an image processing program configured to cause a computer to execute the steps of the image processing method according to claim 1.

15. An image processing apparatus comprising:

an identifiability value obtaining portion configured to obtain, for each pixel address constituting an image plane, an identifiability value for identifying to which of a first inspection result and a second inspection result the pixel address corresponds, by using a feature value of each pixel of a first image obtained by imaging a first target object for which the first inspection result has been obtained and the feature value of each pixel of a second image obtained by imaging a second target object for which the second inspection result has been obtained;

an inspection region generation portion configured to generate an inspection region serving as a target of image processing by setting a portion of the image plane including the pixel address when the obtained identifiability value satisfies a specific condition as the inspection region; and an image inspection portion configured to perform image processing for inspection on a partial image corresponding to the inspection region among a third image obtained by imaging a third target object.

16. A manufacturing system comprising:

the image processing apparatus according to claim 15; and a manufacturing apparatus configured to manufacture the third target object.

\* \* \* \* \*